US 8,827,144 B2

(12) United States Patent
Gomes et al.

(10) Patent No.: US 8,827,144 B2
(45) Date of Patent: Sep. 9, 2014

(54) REINFORCED CARTONS

(75) Inventors: Jean-Manuel Gomes, Marietta, GA (US); Andrea Coltri-Johnson, Morristown, NJ (US)

(73) Assignee: Graphic Packaging International, Inc., Atlanta, GA (US)

( * ) Notice: Subject to any disclaimer, the term of this patent is extended or adjusted under 35 U.S.C. 154(b) by 1297 days.

(21) Appl. No.: 11/524,574

(22) Filed: Sep. 21, 2006

(65) Prior Publication Data

US 2007/0063005 A1    Mar. 22, 2007

Related U.S. Application Data

(60) Provisional application No. 60/719,309, filed on Sep. 21, 2005.

(51) Int. Cl.
*B65D 3/22*   (2006.01)
*B65D 5/00*   (2006.01)
*B65D 5/42*   (2006.01)
*B65D 5/46*   (2006.01)
*B65D 5/44*   (2006.01)
*B65D 5/18*   (2006.01)
*B65D 5/52*   (2006.01)

(52) U.S. Cl.
CPC .............. *B65D 5/18* (2013.01); *B65D 5/46072* (2013.01); *B65D 5/445* (2013.01); *B65D 5/5253* (2013.01); *Y10S 229/937* (2013.01)
USPC ................ 229/122.32; 229/122.34; 229/146; 229/166; 229/199; 229/937

(58) Field of Classification Search
USPC ............... 229/120.09, 146, 199, 166, 122.32, 229/122.34, 164.1, 132, 937
See application file for complete search history.

(56) References Cited

U.S. PATENT DOCUMENTS

| | | | | |
|---|---|---|---|---|
| 499,655 | A | * | 6/1893 | Clark ........................ 229/122.34 |
| 642,121 | A | * | 1/1900 | Hildreth .................... 229/122.32 |
| 1,503,161 | A | | 7/1924 | Hornecker | |
| 1,634,073 | A | | 6/1927 | LaBombarde | |
| 1,656,919 | A | | 1/1928 | Marsh | |
| 1,762,704 | A | | 6/1930 | Smith | |
| 1,901,483 | A | | 3/1933 | Ware, Jr. | |
| 1,912,698 | A | * | 6/1933 | Forsman ....................... 229/126 |
| 1,925,102 | A | | 9/1933 | Levkoff | |
| 1,951,408 | A | | 3/1934 | Haven | |
| 1,971,863 | A | * | 8/1934 | Lupton .................... 229/117.06 |
| 2,027,079 | A | | 1/1936 | Weiss | |

(Continued)

FOREIGN PATENT DOCUMENTS

| | | |
|---|---|---|
| DE | 2 320 190 | 11/1973 |
| DE | 36 27 019 A1 | 2/1988 |

(Continued)

OTHER PUBLICATIONS

European Search Report—EP 08 01 0412.

*Primary Examiner* — Anthony Stashick
*Assistant Examiner* — Latrice Byrd
(74) *Attorney, Agent, or Firm* — Womble Carlyle Sandridge & Rice, LLP

(57) ABSTRACT

A carton has a multi-ply configuration which can be formed by overlying a primary blank with one or more reinforcing blanks.

58 Claims, 17 Drawing Sheets

(56) References Cited

U.S. PATENT DOCUMENTS

| | | | |
|---|---|---|---|
| 2,141,743 A | 12/1938 | Ethridge | |
| 2,145,430 A | 1/1939 | New | |
| 2,152,079 A | 3/1939 | Mott | |
| 2,196,243 A * | 4/1940 | Bensel | 229/206 |
| 2,290,971 A | 7/1942 | King | |
| 2,330,294 A * | 9/1943 | Leavitt et al. | 229/126 |
| 2,383,853 A * | 8/1945 | Guyer | 229/117.16 |
| 2,407,802 A | 9/1946 | Stotter | |
| 2,416,332 A * | 2/1947 | Sylvester | 229/123.2 |
| 2,643,589 A | 6/1953 | Weiss | |
| 2,679,349 A | 5/1954 | Mullinix | |
| 2,710,134 A | 6/1955 | Schroeder et al. | |
| 2,791,362 A | 5/1957 | Nute | |
| 2,875,938 A | 3/1959 | Bramhill | |
| 2,933,228 A | 4/1960 | Guyer | |
| 2,954,913 A * | 10/1960 | Rossman | 229/103.11 |
| 2,967,610 A | 1/1961 | Ebert | |
| 3,002,613 A | 10/1961 | Merkel et al. | |
| 3,090,483 A | 5/1963 | Altree et al. | |
| 3,092,301 A | 6/1963 | Selle | |
| 3,094,266 A | 6/1963 | Hoff | |
| 3,157,342 A | 11/1964 | Grady | |
| 3,158,312 A | 11/1964 | Simkins | |
| 3,199,763 A * | 8/1965 | Anderson | 229/126 |
| 3,265,283 A | 8/1966 | Farquhar | |
| 3,276,665 A | 10/1966 | Rasmussen | |
| 3,280,968 A | 10/1966 | Craine | |
| 3,434,648 A * | 3/1969 | Du Barry, Jr. | 229/122.26 |
| 3,653,495 A | 4/1972 | Gray | |
| 3,677,458 A | 7/1972 | Gosling | |
| 3,759,378 A | 9/1973 | Werth | |
| 3,786,914 A | 1/1974 | Beutler | |
| 3,884,348 A | 5/1975 | Ross | |
| 4,008,849 A | 2/1977 | Baber | |
| 4,059,220 A * | 11/1977 | Lorenz | 229/159 |
| 4,113,100 A | 9/1978 | Soja et al. | |
| 4,519,538 A | 5/1985 | Omichi | |
| 4,558,785 A | 12/1985 | Gordon | |
| 4,586,643 A * | 5/1986 | Halabisky et al. | 229/199 |
| 4,742,917 A | 5/1988 | Bornwasser | |
| 4,760,952 A * | 8/1988 | Wachter et al. | 229/127 |
| 4,773,541 A | 9/1988 | Riddell | |
| 4,778,057 A | 10/1988 | Allen et al. | |
| 4,815,609 A | 3/1989 | Kiedaisch | |
| 4,865,187 A | 9/1989 | Zulauf et al. | |
| 4,886,160 A | 12/1989 | Kilgerman | |
| 4,919,269 A | 4/1990 | Wright et al. | |
| 5,012,929 A | 5/1991 | Roosa | |
| 5,181,650 A | 1/1993 | Hollander et al. | |
| 5,222,660 A * | 6/1993 | Koss | 229/231 |
| 5,328,091 A * | 7/1994 | Koss | 229/231 |
| 5,699,957 A | 12/1997 | Blin et al. | |
| 5,783,030 A * | 7/1998 | Walsh | 156/549 |
| 5,842,576 A | 12/1998 | Snow | |
| 5,857,570 A | 1/1999 | Brown | |
| 5,881,884 A | 3/1999 | Podosek | |
| D412,114 S | 7/1999 | Hansen | |
| 5,921,398 A | 7/1999 | Carroll | |
| 5,927,498 A | 7/1999 | Saam | |
| 5,979,749 A | 11/1999 | Bozich | |
| D419,440 S | 1/2000 | Hansen | |
| 6,015,084 A * | 1/2000 | Mathieu et al. | 229/122.32 |
| 6,027,017 A | 2/2000 | Kuhn et al. | |
| 6,129,211 A | 10/2000 | Prakken et al. | |
| 6,135,289 A | 10/2000 | Miller | |
| 6,158,579 A | 12/2000 | Rosenbaum | |
| 6,386,369 B2 | 5/2002 | Yuhas et al. | |
| 6,419,152 B1 | 7/2002 | Tokarski | |
| 6,435,351 B1 | 8/2002 | Gibb | |
| 6,478,159 B1 | 11/2002 | Taylor et al. | |
| 6,510,982 B2 | 1/2003 | White | |
| 6,523,692 B2 | 2/2003 | Gregory | |
| 6,729,475 B2 | 5/2004 | Yuhas et al. | |
| 6,854,639 B2 * | 2/2005 | Walsh | 229/164.1 |
| 6,869,009 B2 | 3/2005 | Sutherland et al. | |
| 6,905,027 B2 | 6/2005 | Galter | |
| 6,913,189 B2 | 7/2005 | Oliff et al. | |
| 6,918,487 B2 | 7/2005 | Harrelson | |
| 7,021,468 B2 | 4/2006 | Cargile, Jr. | |
| 7,201,714 B2 * | 4/2007 | Zoeckler et al. | 493/89 |
| 2001/0048022 A1 | 12/2001 | Zoeckler | |
| 2002/0170845 A1 | 11/2002 | Oliff | |
| 2003/0226879 A1 | 12/2003 | Auclair et al. | |
| 2005/0092649 A1 | 5/2005 | Ford et al. | |
| 2005/0167291 A1 | 8/2005 | Sutherland | |
| 2005/0218203 A1 | 10/2005 | Harrelson | |
| 2006/0266815 A1 | 11/2006 | Coltri-Johnson et al. | |

FOREIGN PATENT DOCUMENTS

| | | |
|---|---|---|
| DE | 298 17 195 U1 | 11/1998 |
| DE | 202 16 854 U1 | 1/2003 |
| EP | 0 133 595 A2 | 2/1985 |
| EP | 0 704 386 A1 | 4/1996 |
| FR | 1.379.931 | 12/1963 |
| FR | 2 882 032 | 8/2006 |
| GB | 1 218 016 | 1/1971 |
| WO | WO 98/31593 | 7/1998 |
| WO | WO 03/082686 A1 | 10/2003 |
| WO | WO 2004/063031 A1 | 7/2004 |

* cited by examiner

US 8,827,144 B2

REINFORCED CARTONS

RELATED APPLICATION

This application claims the benefit of U.S. Provisional Application No. 60/719,309, filed Sep. 21, 2005, the entire contents of which are hereby incorporated by reference.

BACKGROUND

Cartons are typically shipped in bulk quantities. During shipping, the cartons may be vertically stacked upon each other in order to maximize the amount of product shipped in a particular vessel. The amount of product shipped may depend, however, on the load-bearing capacity of the stacked cartons. It is therefore desirable to produce cartons having high rigidity and/or strength in compression for shipping, and for other purposes such as the protection of the carton contents in general.

A conventional method for increasing the strength of a carton is to produce the carton from a blank of a different, stronger board material, or to produce the blank from the same carton material but of greater thickness. Such methods typically increase the costs associated with manufacturing the carton, with the material costs of manufacture generally increasing according to the cost of increasing the strength and/or thickness of the entire blank. Some sections of the blank, however, may not be load-bearing, and the additional costs associated with increasing the strength of non-load bearing sections of the blank are wasted.

SUMMARY

According to a first aspect of the invention, a carton is formed from a multi-ply carton blank. The carton blank comprises a primary blank and one or more reinforcing blanks overlying the primary blank. The reinforcing blanks can be adhered and/or otherwise attached to selected locations on the primary blank in order to increase desirable properties such as, for example, strength and rigidity in the resultant carton. The size and location of the applied reinforcing blanks can be selected, for example, to minimize board use while providing a desired level of increased strength and/or rigidity.

The foregoing and other features, aspects, and advantages of the invention will become more apparent upon review of the detailed description of the preferred embodiments set forth below when taken in conjunction with the accompanying drawing figures, which are briefly described as follows.

BRIEF DESCRIPTION OF THE DRAWING FIGURES

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Briefly described, the present invention is directed to cartons having enhanced strength and rigidity. The cartons are formed from primary blanks reinforced with one or more reinforcing blanks adhered to the primary blanks. In this specification, the terms "bottom," "side," and "top" are used to indicate orientations determined in relation to fully erected cartons placed in upright configurations, and are not intended to limit the scope of the invention.

Figure 1A:
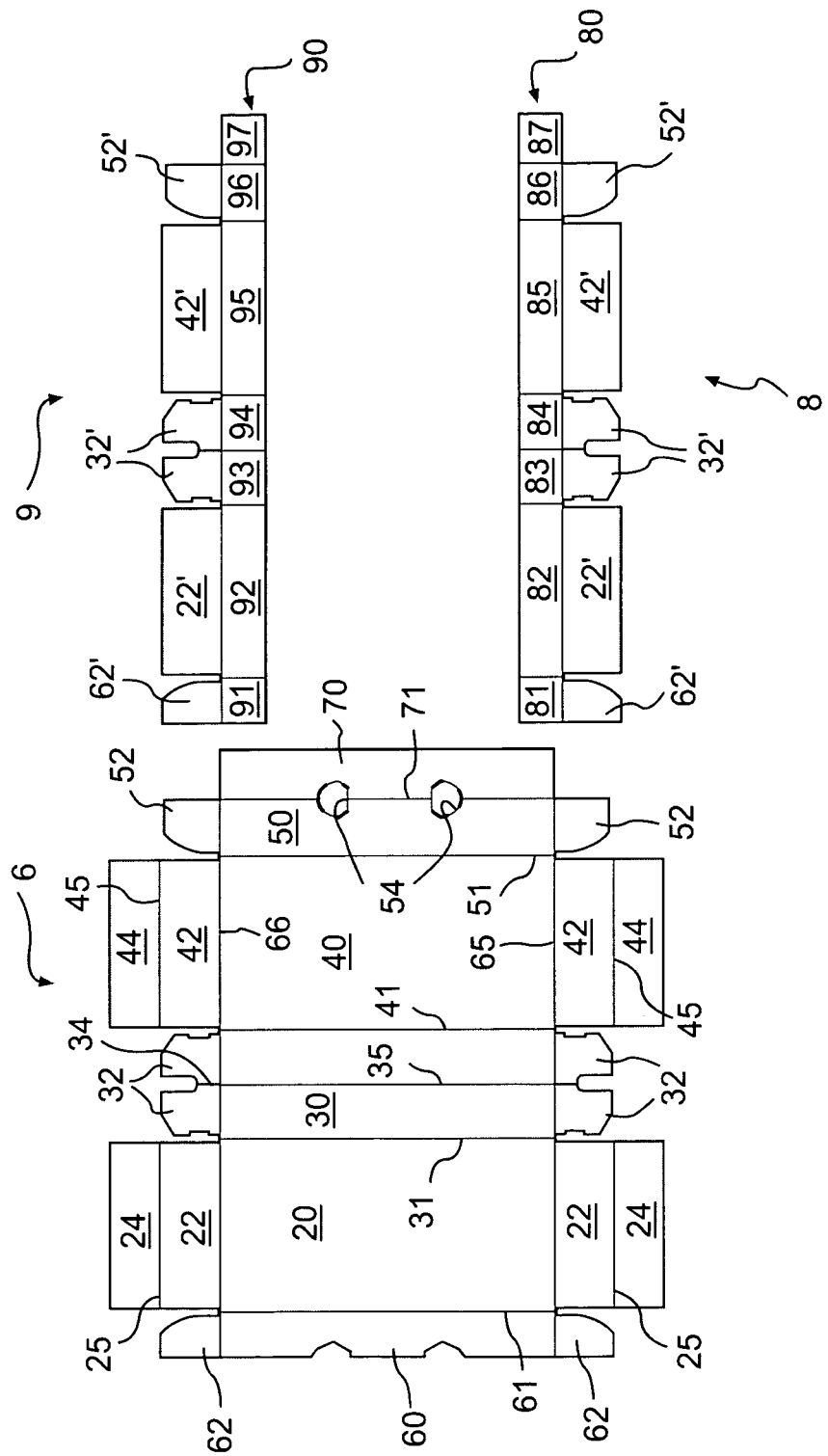
FIG. 1A is a plan view of primary and reinforcing blanks used to form a carton according to a first embodiment of the invention.

FIG. 1A is a plan view of interior sides of a primary blank 6 and first and second reinforcing blanks 8, 9. The blanks 6, 8, 9 are used to form a carton 100 (illustrated in FIGS. 3A and 3B) according to a first embodiment of the invention. The interior sides of the blanks 6, 8, 9 will generally be disposed in the interior of the erected carton 100. The blanks 6, 8, 9 may be combined, for example, into a blank 10 (FIG. 1B) having multi-ply sections formed from adhering the first and second reinforcing blanks 8, 9 to the primary blank 6. As discussed in further detail below, the primary blank 6 can have a periphery that is complementary to portions of the peripheries of the reinforcing blanks 8, 9.

Referring to FIG. 1A, the primary blank 6 comprises a first side panel 20 foldably connected to a bottom panel 30 at a first transversely extending fold line 31, a second side panel 40 foldably connected to the bottom panel 30 at a second transverse fold line 41, and a first top panel 50 foldably connected to the second side panel 40 at a third transverse fold line 41. A second top panel 60 may be foldably connected to the first side panel 20 at a fourth transverse fold line 61, and a third top panel 70 may be foldably connected to the second top panel 50 at a fifth transverse fold line 71. The bottom panel 30 can be foldable at its spine or midpoint at a sixth transverse fold line 35 extending across the width of the bottom panel.

The first side panel 20 is foldably connected at each end to a first proximal side end flap 22, which is connected to a first distal side end flap 24. The bottom panel 30 is foldably connected at each end to two bottom end flaps 32. The bottom end flaps 32 are separated by transversely extending cuts 34. The second side panel 40 is foldably connected at each end to a second proximal side end flap 42, which is connected to a second distal side end flap 44. The first top panel 50 is foldably connected at each end to a first top end flap 52. The second top panel 60 is foldably connected at each end to a second top end flap 62. Handle apertures or knockouts 54 may be formed in one or both of the first and third top panels 50, 70. The end flaps 22, 24, 32, 42, 44, 52, 62 extend along a first and a second marginal area of the blank 6, and may be connected at first and second longitudinally extending fold lines 65, 66. The longitudinal fold lines 65, 66 may be straight, or they may be offset at one or more locations to account for, for example, blank thickness. The first side end flaps 22, 24 are foldably connected at longitudinal fold lines 25, and the second side end flaps 42, 44 are foldably connected at longitudinal fold lines 45.

The first reinforcing blank 8 has a perimeter that may be in part generally complementary to a part of the first marginal area of the primary blank 6. The first reinforcing blank 8 is meant to overlie a part of the first marginal area of the primary blank 6 in order to reinforce the blank 6. The first reinforcing blank 8 includes a strip 80 of sequentially arranged rectangular reinforcing panels 81, 82, 83, 84, 85, 86, 87, and foldably attached reinforcing end flaps 62', 22', 32', 32', 42', 52'. During erection, the blank 8 is placed over the primary blank 6 so that the reinforcing end flaps 62', 22', 32', 32', 42', 52' of the first reinforcing blank 8 overlie and generally conform in shape to corresponding end flaps 62, 22, 32, 32, 42, 52, respectively, of the primary blank 6. The sequentially arranged reinforcing panels 81, 82, 83, 84, 85, 86, 87 are aligned with respective panels 60, 20, 30, 40, 50, 70 of the primary blank 6 so that the reinforcing blank 9 folds along the transverse fold lines 61, 31, 35, 41, 51, 71 in the primary blank 6.

Similarly, the second reinforcing blank 9 has a shape that may be in part generally complementary to a part of the second marginal area of the primary blank 6, and is meant to overlie and reinforce a second part of the first blank 6. The second reinforcing blank 9 includes a strip 90 of sequentially arranged rectangular reinforcing panels 91, 92, 93, 94, 95, 96, 97, and reinforcing end flaps 62', 22', 32', 32', 42', 52'. During erection, the second reinforcing blank 9 is placed over the primary blank 6 so that the reinforcing end flaps 62', 22', 32', 32', 42', 52' of the reinforcing blank 9 overlie and generally conform in shape to the end flaps 62, 22, 32, 32, 42, 52 of the primary blank 6. The reinforcing panels 91, 92, 93, 94, 95, 96, 97 are aligned with respective panels 60, 20, 30, 40, 50, 70 of the primary blank 6 so that the second reinforcing blank 9 folds along the transverse fold lines 61, 31, 35, 41, 51, 71 of the primary blank 6. Portions of the second reinforcing blank 9 may be, for example, a mirror image of the first reinforcing blank 8, and certain common reference numerals are therefore used in the reinforcing blanks 8 and 9.

Figure 1B:
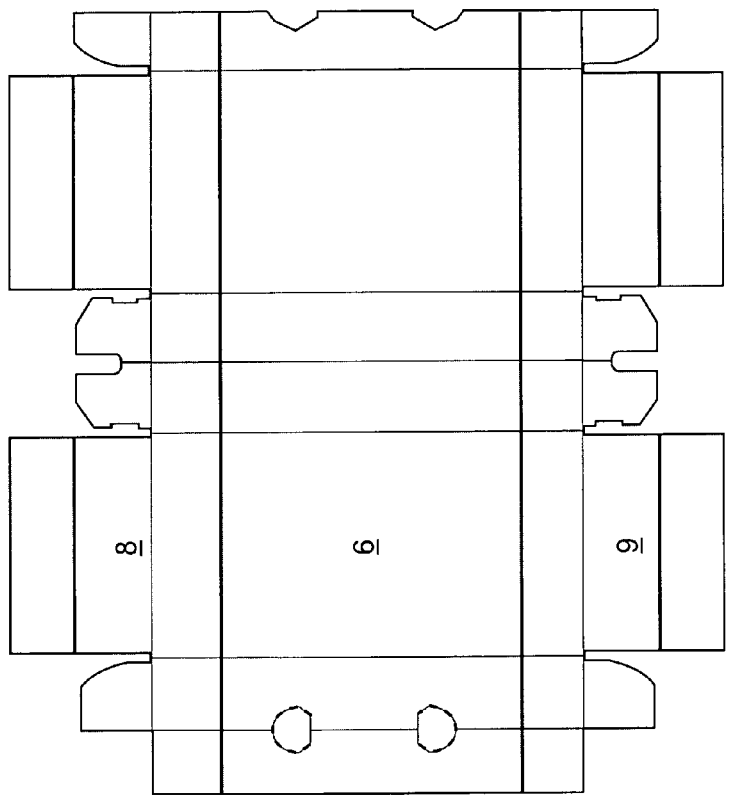
FIG. 1B illustrates the blanks of FIG. 1A combined into a multi-ply blank.

FIG. 1B illustrates the primary blank 6 and the reinforcing blanks 8, 9 combined into a multi-ply blank 10. In FIG. 1B, the reinforcing blanks 8, 9 are placed over the respective first and second marginal areas of the primary blank 6 and secured thereto 6. The first and second distal side end flaps 24, 44 at each end of the primary blank 6 extend beyond the edges of the reinforcing blanks 8, 9. Glue, for example, or other adhesives, or other means, may be used to secure the reinforcing blanks 8, 9 to the primary blank.

Figure 2A:
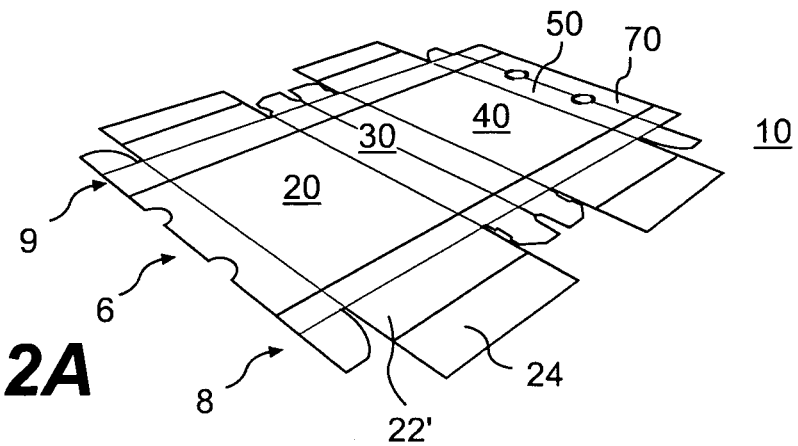
FIGS. 2A-2E illustrate erection of the first carton embodiment from the blank of FIG. 1B.
Figure 2B:
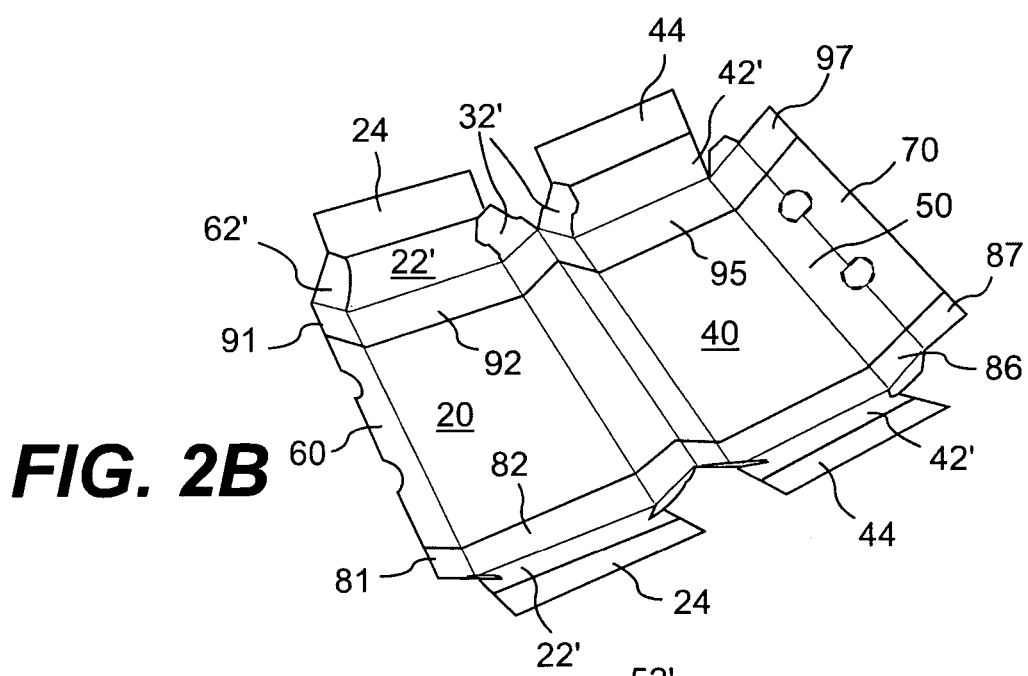
Figure 2C:
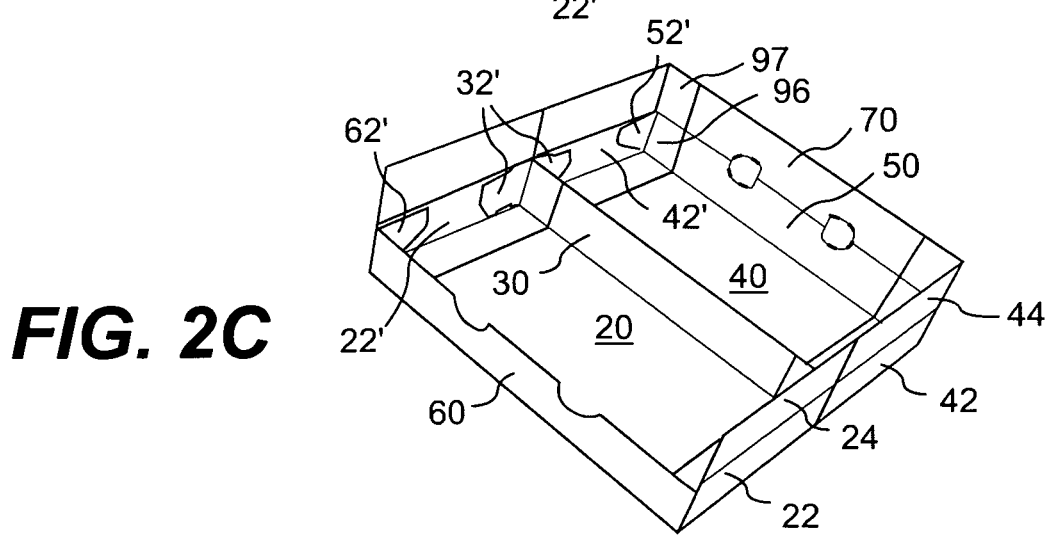
Figure 2D:
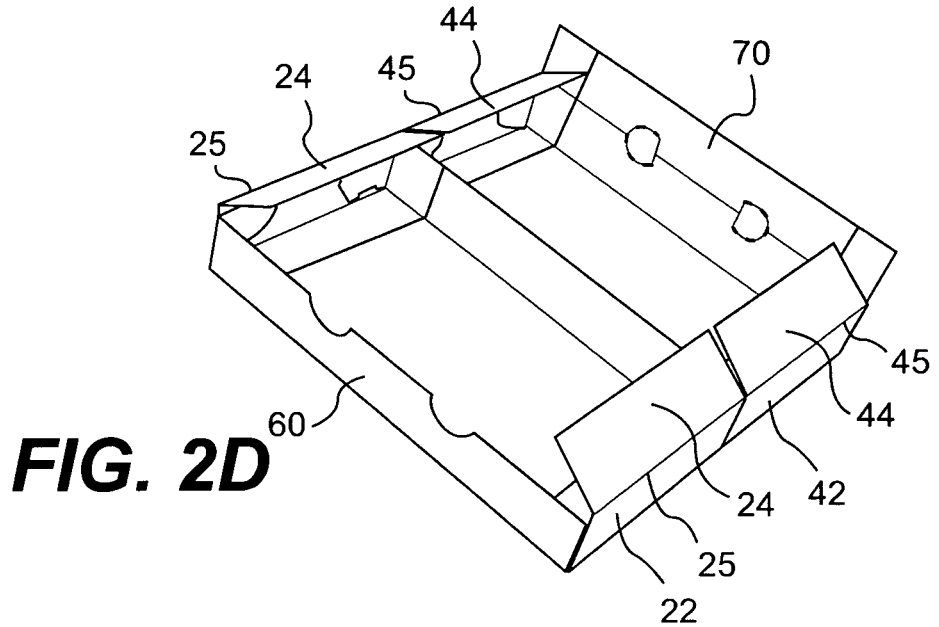
Figure 2E:
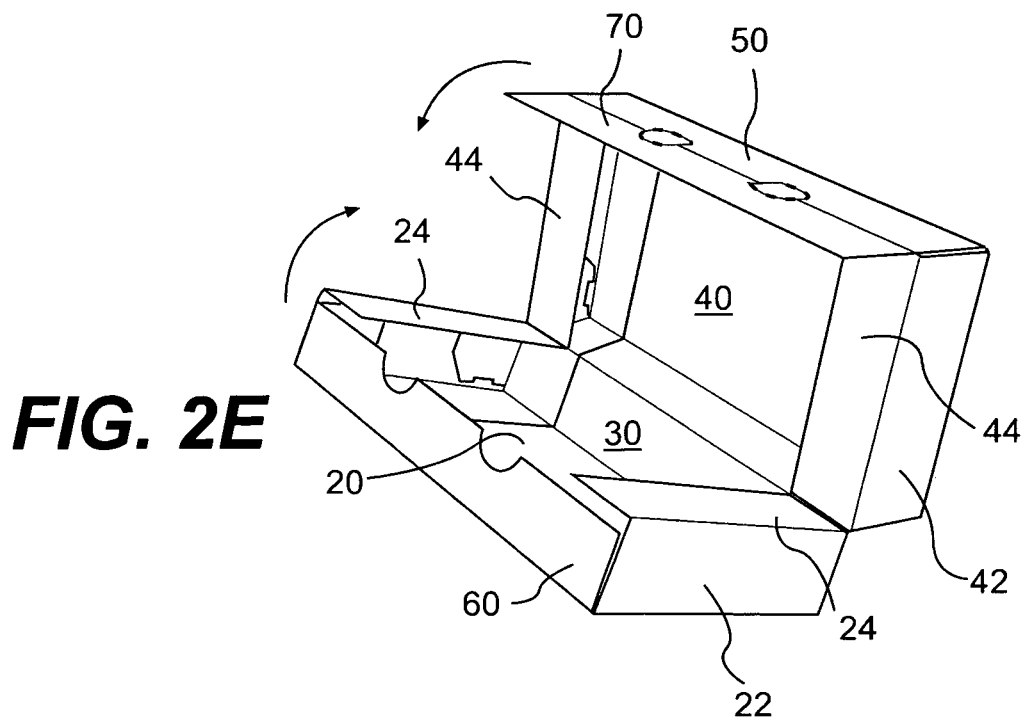
Figure 3A:
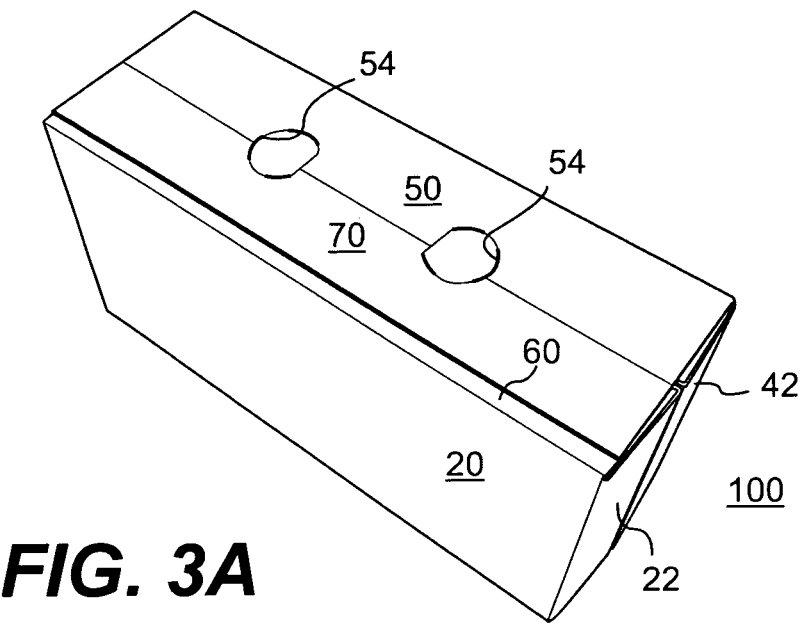
FIGS. 3A and 3B illustrate the first carton embodiment.
Figure 3B:
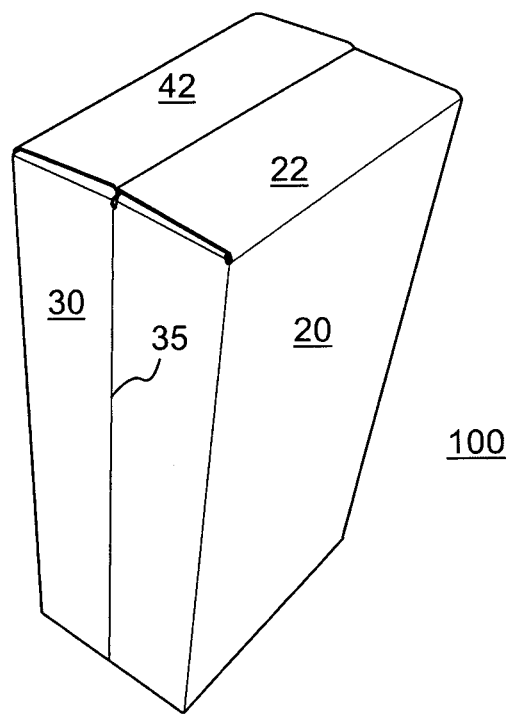

FIGS. 2A-2E illustrate erection of the multi-ply blank 10 into the carton 100. Certain elements of the blanks 6, 8, 9 referred to in the following description may not be visible in FIGS. 2A-2E, and such elements can be found in FIGS. 1A and 1B. FIG. 2A illustrates the multi-ply blank 10 ready for erection. In FIG. 2B, the end flaps 22, 24, 32, 32, 42, 44, 52, 62 (along with the reinforcing end flaps 62', 22', 32', 32', 42', 52') and the top panels 50, 60, 70 are folded inwardly. In FIG. 2C, the exterior sides of the end flaps 62, 32 are adhered to the interior sides of the reinforcing end flaps 22', and the exterior sides of the end flaps 32 and 52 are adhered to the interior sides of the reinforcing end flaps 42'. In FIG. 2D, the first and second side distal end flaps 24, 44 are folded inwardly until they are generally parallel to the first and second side panels 20, 40, respectively. FIG. 2E illustrates the partially erected blank 10 being folded in the direction of the arrows to bring the opposed halves of the partially erected carton together. The opposed distal side end flaps 24, 44 may optionally be adhered together, if desired. The interior side of the third top panel 70 may be adhered to the exterior side of the second stop panel 60 to complete erection of the carton 100, as shown in FIGS. 3A and 3B. Articles (not shown) may be loaded into the carton 100 at any time prior to fully closing the carton 100.

FIGS. 3A and 3B illustrate the erected carton 100. The carton 100 may be, for example, generally parallelepipedal, and may have a closed or nearly closed configuration. In FIG. 3A, the carton 100 rests on the bottom panel 30. The first and second proximal side end flaps 22, 42 along with the reinforcing end flaps 22', 42' adhered thereto close the ends of the carton 100. The handle apertures 54 are accessible in the top panels 50, 70.

Figure 4A:
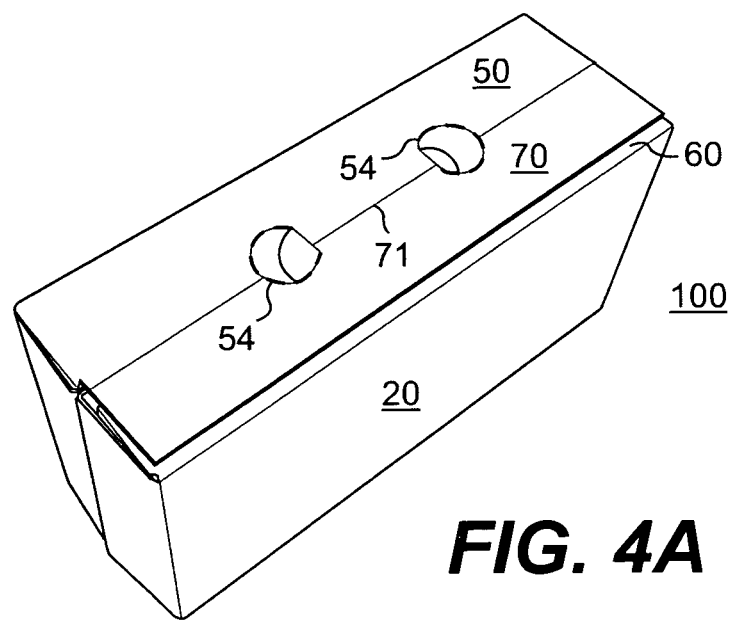
FIG. 4A illustrates the first carton embodiment with its handles accessed.
Figure 4B:
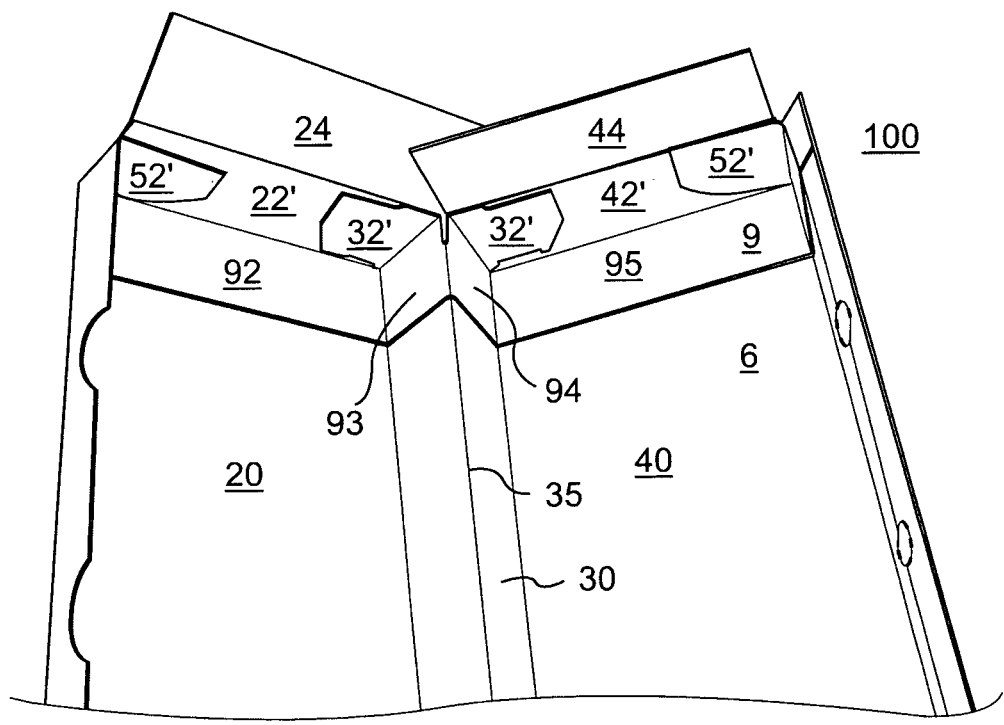
FIG. 4B illustrates the first carton embodiment after opening the carton.

FIG. 4A illustrates the erected carton 100 with the handle apertures 54 accessed. FIG. 4B illustrates a portion of the interior of the carton 100 with the carton 100 fully opened. The carton 100 can be opened, for example, by separating the attachment of the third top panel 70 to the second top panel 60. FIG. 4B illustrates the reinforcing configuration of the reinforcing blank 9 in the carton 100. The reinforcing blank 9, as well as the reinforcing blank 8 (illustrated in FIG. 1A), provides additional strength and rigidity to the carton 100. For example, when the carton 100 is supported on the bottom panel 30 as shown in FIG. 4A, the panels and flaps 92, 95, 22', 42' of the reinforcing blank 9, and the reinforcing panels and flaps 82, 85, 22', 42' of the reinforcing blank 8 extend vertically within the carton 100 interior and provide significant strength against vertical axial compression. Similarly, if the carton 100 is supported on either of its side panels 20, 40, the first and second reinforcing blanks 8, 9 provide significant additional axial compressive strength and rigidity to the primary blank 6.

Figure 5:
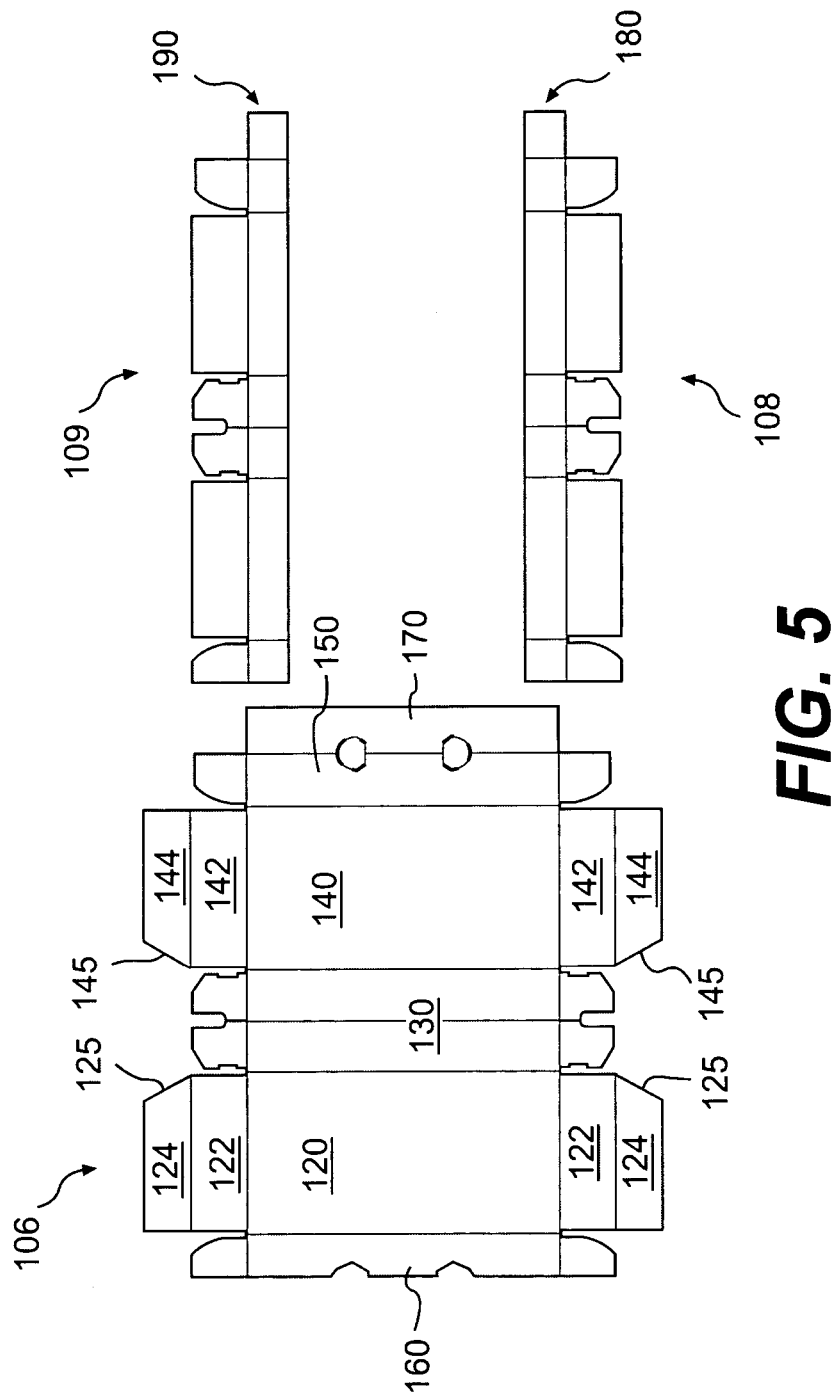
FIG. 5 is a plan view of primary and reinforcing blanks used to form a carton according to a second embodiment of the invention.

FIG. 5 illustrates a primary blank 106 and first and second reinforcing blanks 108, 109 according to a second embodiment of the invention. In FIG. 5, like reference numbers to the reference numbers shown in FIG. 1A indicate like or similar elements, with the reference numbers in FIG. 5 being preceded by "1." A resultant multi-ply blank formed from the primary and reinforcing blanks 106, 108, 109 can be erected into a carton using the method shown in FIGS. 2A-2E. The primary blank 106 is substantially identical to the primary blank 6, except the first and second distal side end flaps 124, 144 include beveled or truncated corners 125, 145, respectively. The beveled corners 125, 145, may, for example, provide ease of folding of the distal side end flaps 124, 144, respectively during erection. The corners may be, for example, truncated with alternative cut patterns, such as arcuate or curved patterns.

Figure 6A:
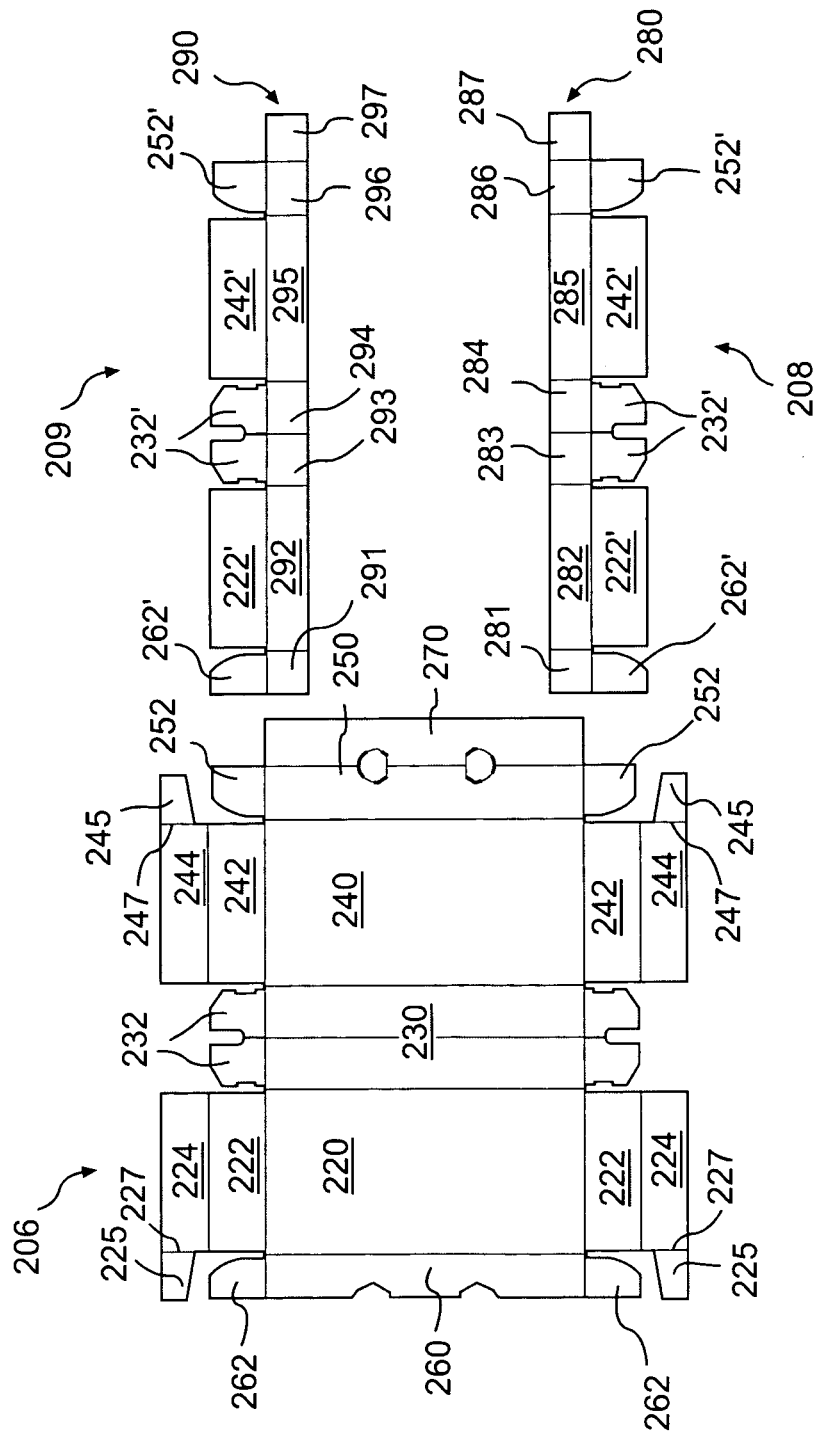
FIG. 6A is a plan view of primary and reinforcing blanks used to form a carton according to a third embodiment of the invention.
Figure 6B:
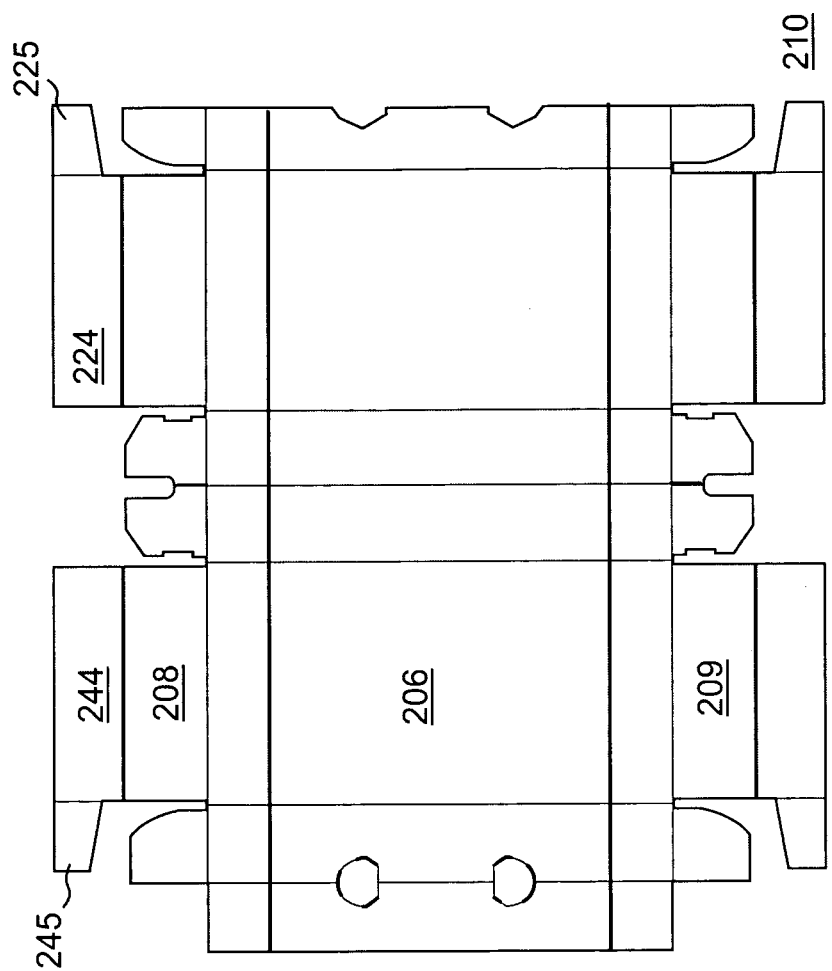
FIG. 6B illustrates the blanks of FIG. 6A combined into a multi-ply blank.

FIG. 6A is a plan view of a primary blank 206 and first and second reinforcing blanks 208, 209 used to form a carton 300 (illustrated in FIG. 8) according to a third embodiment of the invention. The primary blank 205 is substantially identical to the primary blank 6 shown in FIG. 1A, except the first and second side distal end flaps 224, 244 include first and second extensions 225, 245, respectively. In FIGS. 6A-8, like reference numbers to the reference numbers shown in FIG. 1A indicate like or similar elements, with the reference numbers in FIGS. 6A-8 being preceded by "2.". FIG. 6B illustrates a multi-ply blank 210 formed by adhering the first and second reinforcing blanks 208, 209 to the primary blank 206.

Figure 7A:
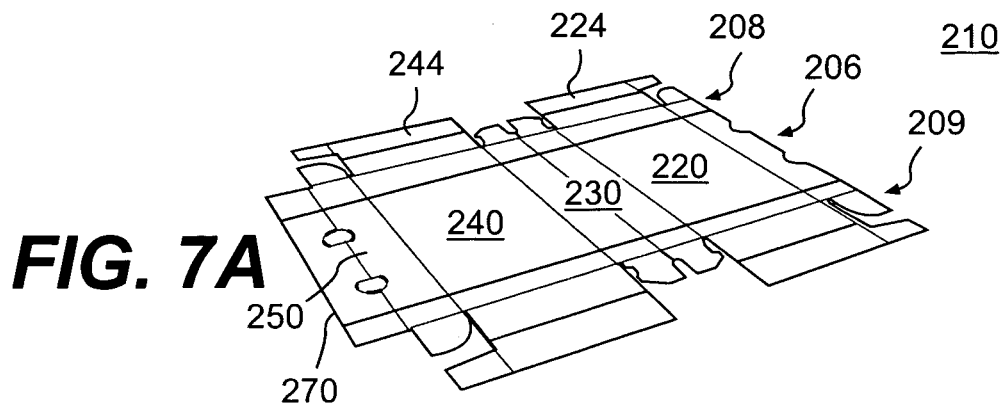
FIGS. 7A-7E illustrate erection of the third carton embodiment.
Figure 7B:
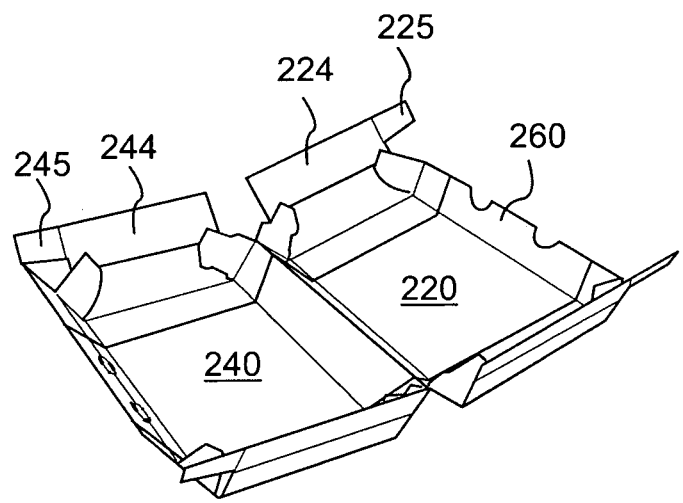
Figure 7C:
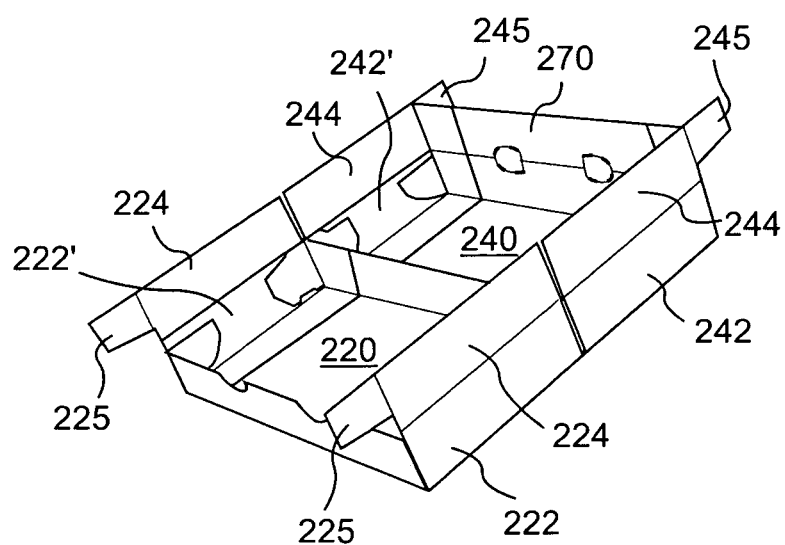
Figure 7D:
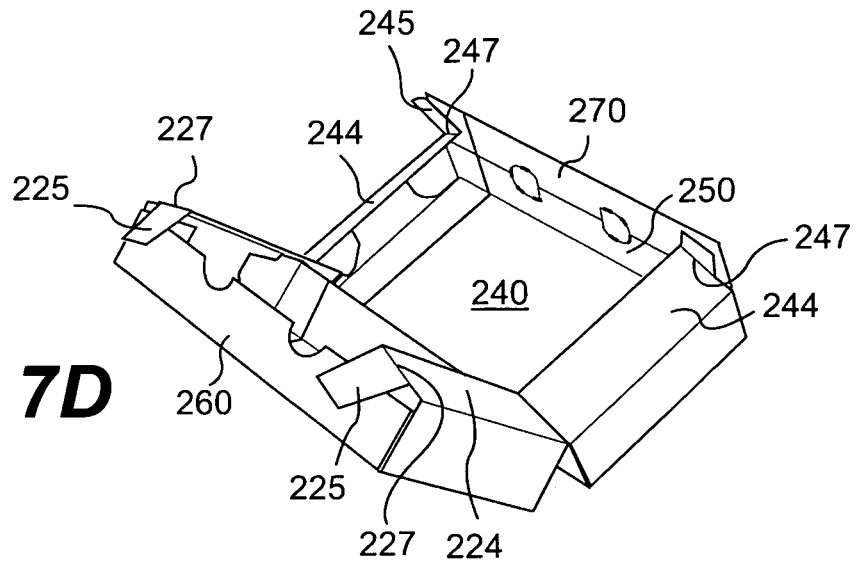

FIGS. 7A-7E illustrate erection of the multi-ply blank 210 into the carton 300. Certain elements of the blanks 206, 208, 209 may not be visible in FIGS. 7A-7E, and such elements can be found in FIGS. 6A and 6B. In FIG. 7B, the end flaps 222, 224, 232, 232, 242, 244, 252, 262 (along with the reinforcing flaps 262', 222', 232', 232', 242', 252') and the top panels 250, 260, 270 are folded inwardly. In FIG. 7C, the exterior sides of the end flaps 262, 232 are adhered to the interior sides of the reinforcing side end flaps 222', and the exterior sides of the end flaps 232 and 252 are adhered to the interior sides of the reinforcing side end flaps 242'. In FIG. 7D, the first and second side distal end flaps 224, 244 are folded inwardly. The second extensions 245 are folded upwardly about their respective fold lines 247 so that they abut the interior side of the third top panel 270. If desired, the second extensions 245 may be adhered to the third top panel 270. The first extensions 225 are folded about their respective fold lines 227 so that they overlap the exterior side of the second top panel 260. If desired, the first extensions 225 may be adhered to the second top panel 260.

Figure 7E:
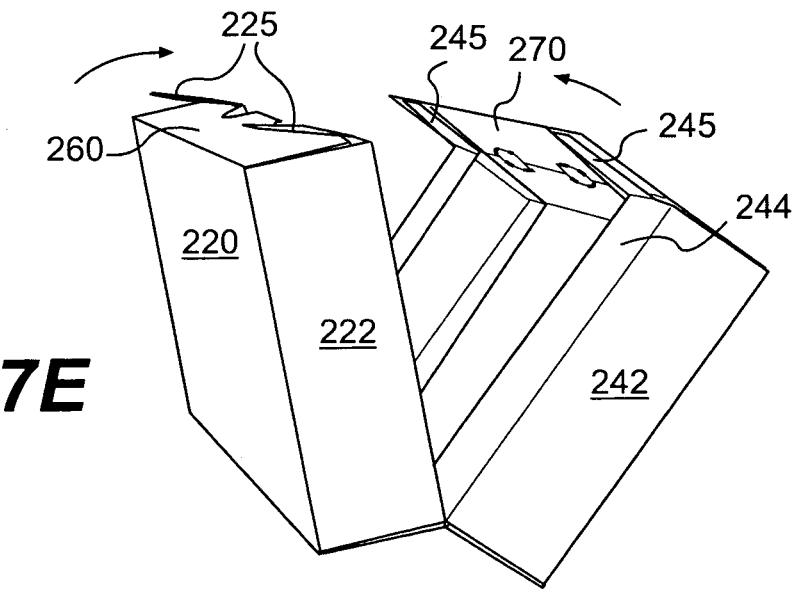
Figure 8:
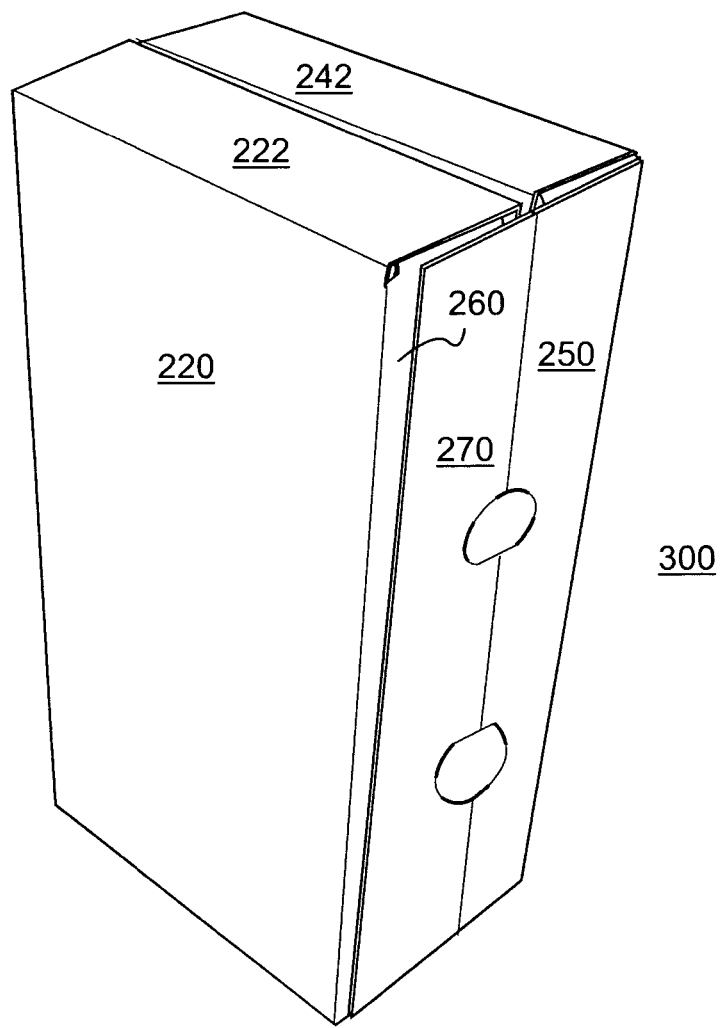
FIG. 8 illustrates the third carton embodiment.

FIG. 7E illustrates the partially erected blank 210 being folded to bring the opposed halves of the partially erected carton together. The opposed first and second distal side end flaps 224, 244 at one or both ends of the carton may be adhered together, if desired. The interior side of the third top panel 270 may be adhered to the exterior side of the second stop panel 260 to complete erection of the carton 300. The erected carton 300 is illustrated in FIG. 8. Articles (not shown) may be placed in the carton 300 at any time prior to fully closing the carton 300. In the carton 300, adhering the first and second extensions 225, 245 to the respective top panels 260, 270 maintains the distal side end flaps 224, 244 in the carton interior such that that they are generally parallel to the first and second side panels 220, 240.

Figure 9A:
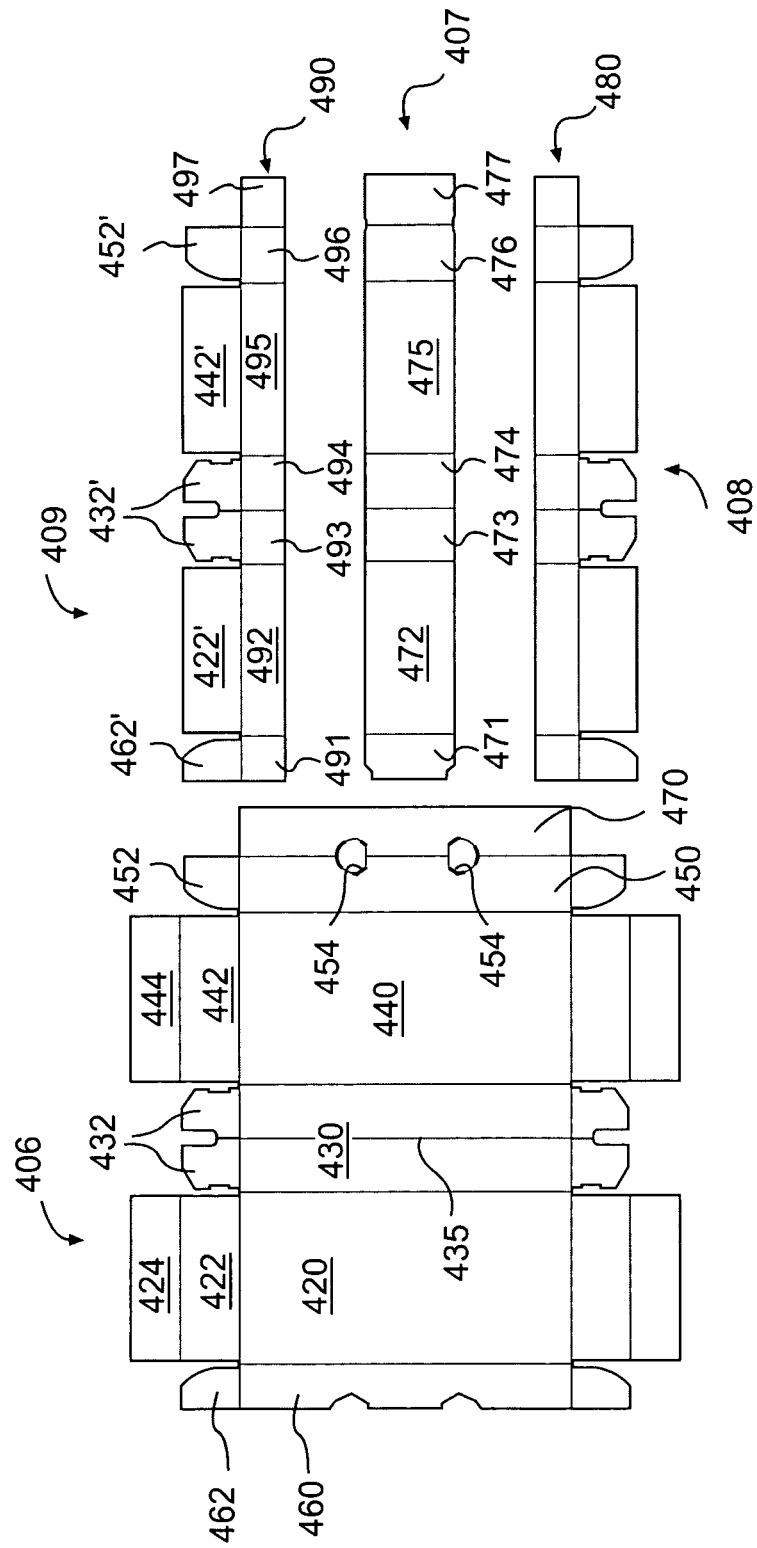
FIG. 9A is a plan view of primary and reinforcing blanks used to form a carton according to a fourth embodiment of the invention.

FIG. 9A illustrates a primary blank 406 and first, second and third reinforcing blanks 408, 409, 407 for forming a carton 500 (illustrated in FIG. 10) according to a fourth embodiment of the invention. In FIG. 9A, like reference numbers to the reference numbers shown in FIG. 1A indicate like or similar elements, with the reference numbers in FIG. 9A being preceded by "4." The primary blank 406 and the first and second reinforcing blanks 408, 409 may be substantially identical to the blanks 6, 8, 9, respectively.

Figure 9B:
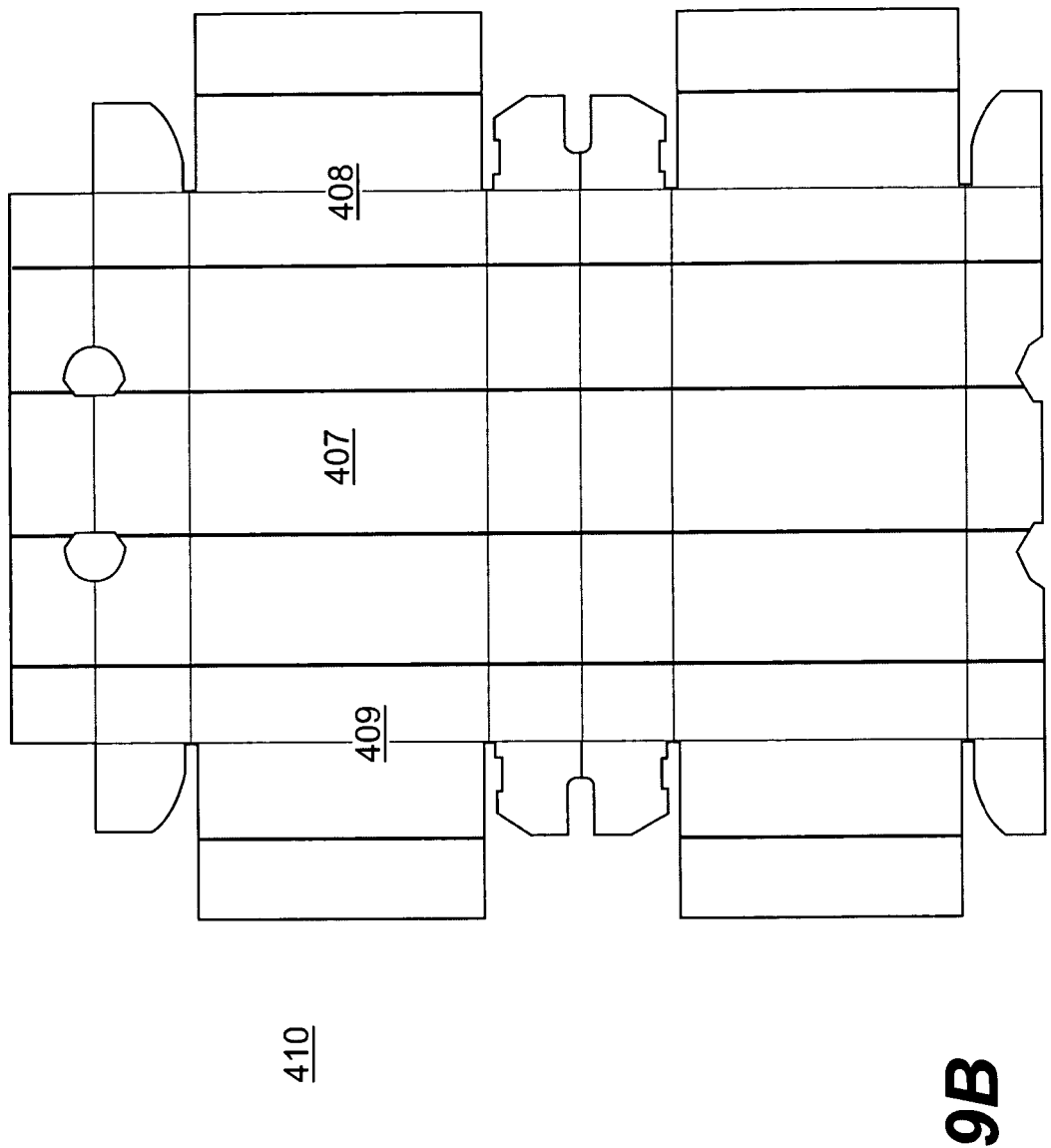
FIG. 9B illustrates the blanks of FIG. 9A combined into a multi-ply blank.

The third reinforcing blank 407 is designed to overlie and reinforce a central section of primary blank 406. The third reinforcing blank 407 comprises a series of sequentially arranged reinforcing panels 471, 472, 473, 474, 475, 476, 477. During erection, the third reinforcing blank 407 is placed over the primary blank 406 so that the reinforcing panels 471, 472, 473, 474, 475, 476, 477 overlie and are adhered to the panels 460, 420, 430, 440, 450, 470 of the primary blank 460. The resultant multi-ply blank 410 formed from the blanks 406, 407, 408, 409 is shown in FIG. 9B. In FIG. 9B, the third reinforcing blank 407 is centrally located between the first and second reinforcing blanks 408, 409, although other orientations are possible.

Figure 10:
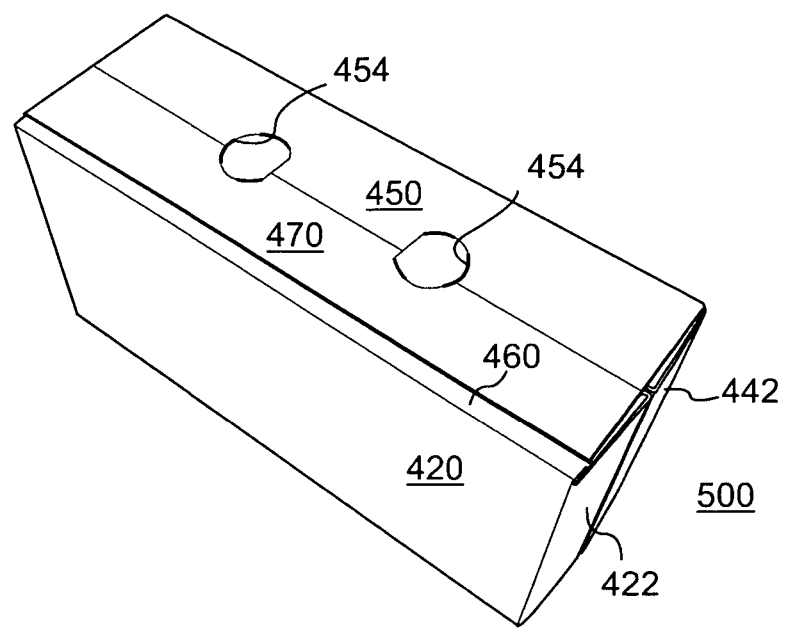
FIG. 10 illustrates the fourth carton embodiment.
Figure 11:
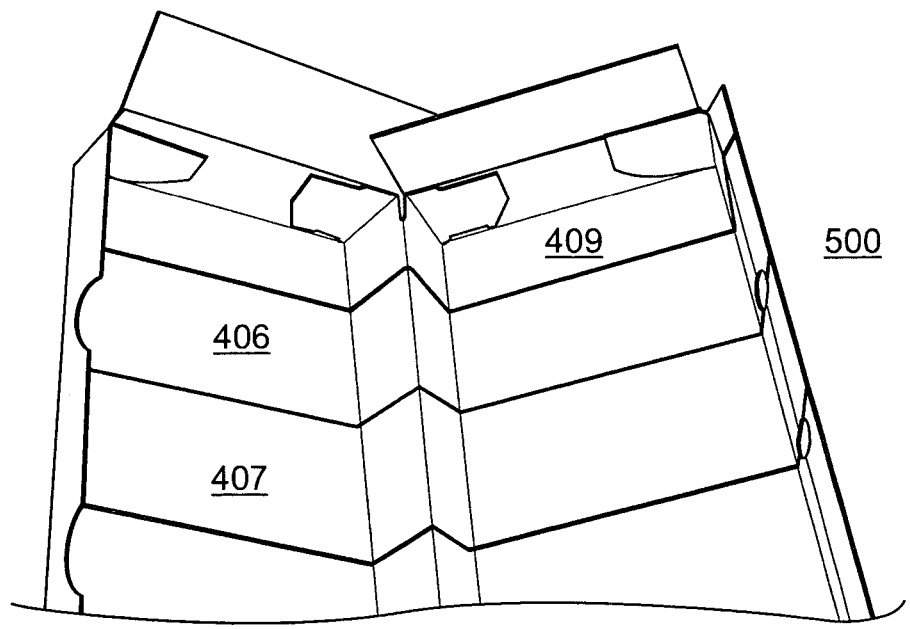
FIG. 11 illustrates the fourth carton embodiment after opening the carton.

Referring to FIG. 9B, the multi-ply blank 410 can be erected into a carton using the method shown in FIGS. 2A-2E. FIG. 10 illustrates the carton 500 erected from the blank 410. FIG. 11 illustrates the carton 500 after opening, and shows the position of the reinforcing blanks 407, 409 in the erected carton.

FIGS. 12A-12E illustrate an alternative method of erecting the blank 10 illustrated in FIG. 1B into a carton. The method shown in FIGS. 12A-12E is essentially identical to the method shown in FIGS. 2A-2E, except that in FIG. 12B, the first and second distal side end flaps 24, 44 are folded over flat about the longitudinal fold lines 25, 45, respectively. The interior sides of the distal side end flaps 24, 44 are then in a position to be adhered to the interior sides of the reinforcing end flaps 22', 42', respectively.

Figure 12A:
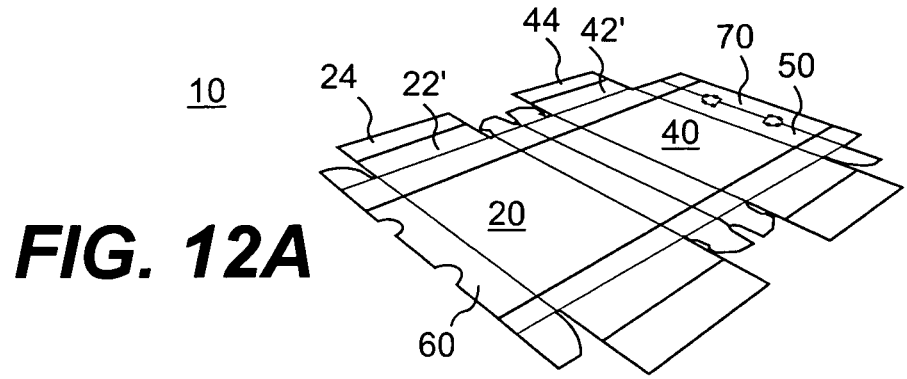
FIGS. 12A-12E illustrate an alternative method of erecting the multi-ply blank of FIG. 1B into a carton.
Figure 12B:
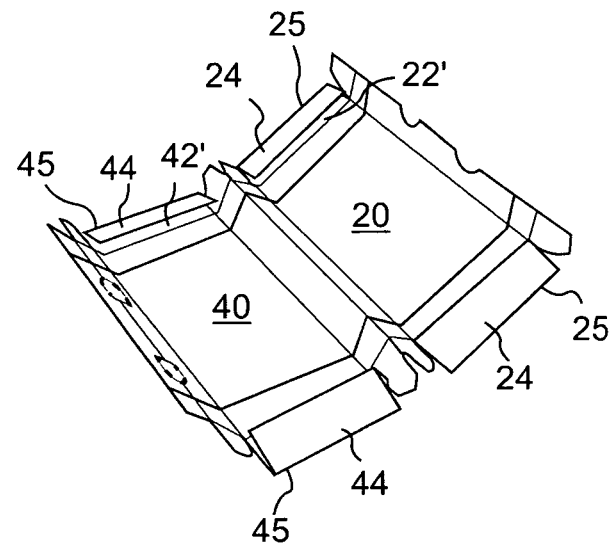
Figure 12C:
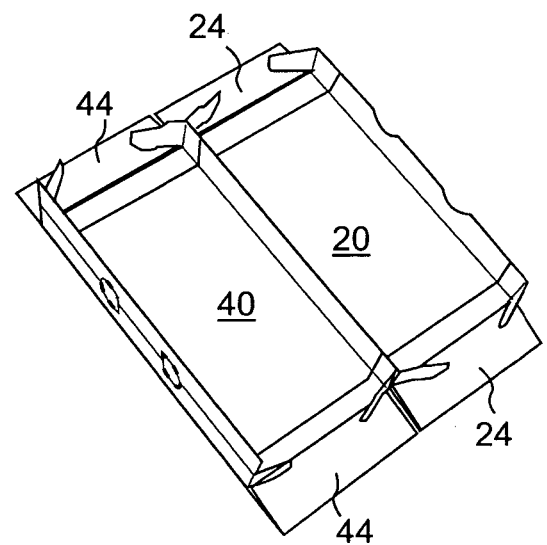
Figure 12D:
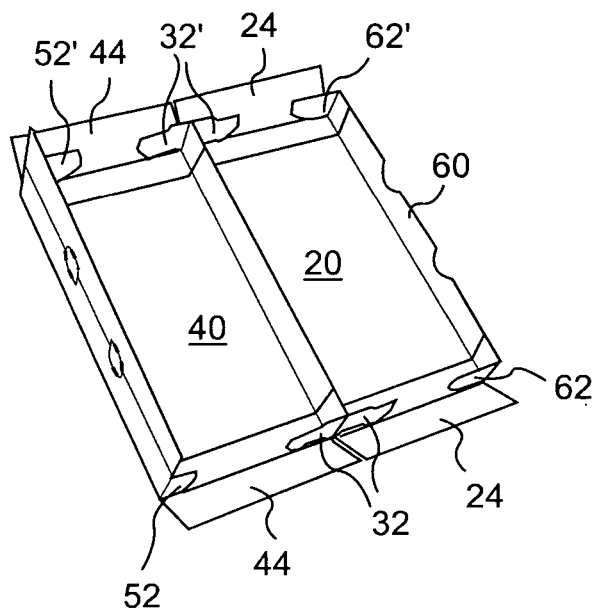
Figure 12E:
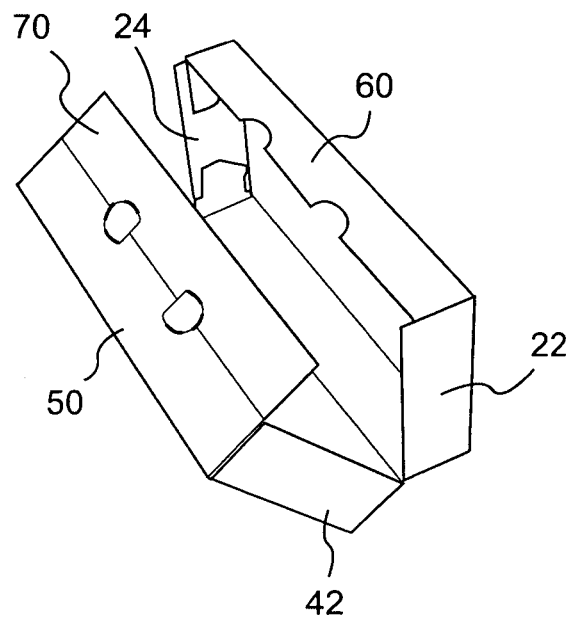

Referring to FIGS. 12C and 12D, the exterior sides of the end flaps 32, 52 may be adhered to the second distal side end flaps 44, and the exterior sides of the end flaps 32, 62 may be adhered to the first distal side end flaps 24. FIG. 12E illustrates closing of the opposite sides of the carton so that the third top panel 70 can be adhered to the second top panel 60.

According to the above embodiments, a primary blank can be reinforced at selected locations by reinforcing blanks. The carton formed from the resulting multi-ply blank can accordingly have enhanced strength and rigidity at selected sections of the carton. According to the present invention, selected reinforcement of specific areas of the primary blank can produce a high strength carton while using relatively small amounts of board.

One or more of the reinforcing blanks discussed above may be omitted in the above embodiments, for example, if a lesser amount of reinforcement is sufficient for a particular application.

In accordance with the exemplary embodiments, the cartons may be constructed of paperboard, for example. The blanks, and thus the cartons, can also be constructed of other materials, such as cardboard, solid unbleached sulfate (SUS) board, or any other material having properties suitable for enabling the carton to function at least generally as described above.

In one exemplary embodiment, the primary and reinforcing blanks are formed from SUS board. The primary blank has a caliper in the range of about 14-30 point, which may be more specifically in the range of about 18-26 point. The caliper of the reinforcing blanks can be slightly less than the primary blank, and can be in the range of about 14-20 point.

The blanks can also be laminated to or coated with one or more additional sheet-like materials at selected panels or panel sections. One or more panels of the blanks discussed above can be coated with varnish, clay, or other materials, either alone or in combination. The coating may then be printed over with product, advertising, and other information or images. The blanks may also be coated to protect any information printed on the blanks. The blanks may be coated with, for example, a moisture barrier layer, on either or both sides of the blanks.

In accordance with the above-described embodiments of the present invention, a fold line can be any substantially linear, although not necessarily straight, line of disruption or other form of weakening that facilitates folding therealong.

In the present specification, a "panel" or "flap" need not be flat or otherwise planar. A "panel" or "flap" can, for example, comprise a plurality of interconnected generally flat or planar sections.

The above embodiments may be described as having one or more panels adhered together by glue. The term "glue" is intended to encompass all manner of adhesives commonly used to secure carton panels in place.

The foregoing description of the invention illustrates and describes the present invention. Additionally, the disclosure shows and describes only selected embodiments of the invention, but it is to be understood that the invention is capable of use in various other combinations, modifications, and environments and is capable of changes or modifications within the scope of the inventive concept as expressed herein, commensurate with the above teachings, and/or within the skill or knowledge of the relevant art.

What is claimed is:

1. A carton blank, comprising:
a primary blank, the primary blank comprising:
a plurality of foldably connected primary panels;
a plurality of first primary end flaps, each first primary end flap being foldably connected to at least one of the primary panels; and
a plurality of second primary end flaps, each second primary end flap being foldably connected to at least one of the primary panels; and
a first reinforcing blank attached to the primary blank, wherein the first reinforcing blank and the primary blank comprise substantially identical materials, the first reinforcing blank comprising:
a plurality of foldably connected first reinforcing panels; and
a plurality of first reinforcing end flaps, each of the first reinforcing end flaps is respectively foldably connected to a respective one of the plurality of first reinforcing panels, at least one of the first reinforcing end flaps overlying and generally conforming in shape to a corresponding first primary end flap of the primary blank;
wherein the plurality of first primary end flaps comprises at least one first free edge portion that extends in a generally longitudinal direction, and the plurality of first reinforcing end flaps comprises at least one second free edge portion that is generally aligned with the first free edge portion;
wherein the plurality of first primary end flaps comprises at least one distal end flap foldably connected to at least one proximal end flap along a longitudinal fold line, and at least one first reinforcing end flap of the plurality of first reinforcing end flaps overlaps the at least one proximal end flap and comprises at least one third free edge portion that generally overlaps the longitudinal fold line.

2. The carton blank of claim 1, wherein each of the first reinforcing panels is adhered to at least one of the primary panels.

3. The carton blank of claim 2, wherein each of the first reinforcing flaps being adhered to at least one of the first primary end flaps.

4. The carton blank of claim 3, further comprising a second reinforcing blank adhered to the primary blank.

5. The carton blank of claim 4, wherein the second reinforcing blank comprises a plurality of foldably connected second reinforcing panels, wherein each of the second reinforcing panels is adhered to at least one of the primary panels.

6. The carton blank of claim 4, wherein the second reinforcing blank comprises a plurality of foldably connected second reinforcing flaps, wherein each of the second reinforcing flaps is adhered to at least one of the second primary end flaps.

7. The carton blank of claim 4, wherein the first reinforcing blank is adhered to a first marginal area of the primary blank and the second reinforcing blank is adhered to a second marginal area of the primary blank.

8. The carton blank of claim 4, further comprising a third reinforcing blank adhered to the primary blank between the first and second reinforcing blanks.

9. The carton blank of claim 4, wherein the plurality of foldably connected primary panels comprises a first side panel, a bottom panel, a second side panel, and at least one top panel.

10. The carton blank of claim 9, wherein the bottom panel comprises a transverse fold line extending across a width of the bottom panel.

11. The carton blank of claim 1, wherein the first reinforcing blank is adhered to a first marginal area of the primary blank.

12. The carton blank of claim 1, wherein the plurality of foldably connected primary panels comprises a first side panel, a bottom panel, a second side panel, and at least one top panel.

13. The carton blank of claim 12, wherein the at least one proximal end flap is foldably connected to the first side panel.

14. The carton blank of claim 13, wherein the first reinforcing blank is adhered to at least the first and second side panels.

15. The carton blank of claim 14, wherein the first reinforcing blank is adhered to the top panel, the bottom panel, and one or more of the first primary end flaps.

16. The carton blank of claim 1 wherein the plurality of first reinforcing end flaps are formed separately from the corresponding end flaps of the primary blank prior to attachment of the first reinforcing blank to the primary blank.

17. The carton blank of claim 1 wherein at least one of the first reinforcing end flaps is sized and shaped to correspond to the size and shape of a corresponding one of the first primary end flaps.

18. The carton blank of claim 1 wherein each of the first reinforcing end flaps is in face-to-face contact with a corresponding one of the first primary end flaps.

19. The carton blank of claim 1, wherein the plurality of first primary end flaps comprises at least one arcuate fourth free edge portion, and the plurality of first reinforcing end flaps comprises at least one fifth free edge portion that is generally aligned with the fourth free edge portion.

20. The carton blank of claim 1, wherein the plurality of first primary end flaps comprises at least one oblique fourth free edge portion, and the plurality of first reinforcing end flaps comprises at least one fifth free edge portion that is generally aligned with the fourth free edge portion.

21. The carton blank of claim 1, wherein the plurality of first primary end flaps comprises at least one fourth free edge portion that extends in a generally lateral direction, the fourth free edge portion comprising a notch, and the plurality of first reinforcing end flaps comprises at least one fifth free edge portion that is generally aligned with the fourth free edge portion.

22. The carton blank of claim 1, wherein the at least one distal end flap is for being disposed generally perpendicular to the at least one proximal end flap when the carton blank is formed into a carton.

23. The carton blank of claim 1, wherein the first reinforcing blank is spaced apart from the plurality of second primary end flaps.

24. A carton blank, comprising:
a primary blank, the primary blank comprising:
a first side panel;
a bottom panel;
a second side panel;
a top panel;
a plurality of first primary end flaps disposed in a first marginal area of the primary blank, wherein at least one first primary end flap of the plurality of first primary end flaps comprises a first proximal side end flap foldably connected to the first side panel, and a first distal side end flap foldably connected to the first proximal side end flap along a longitudinal fold line; and a plurality of second primary end flaps disposed in a second marginal area of the primary blank; and
a first reinforcing blank attached to the first marginal area of the primary blank, wherein the first reinforcing blank and the primary blank comprise substantially identical materials, the first reinforcing blank comprising:
a plurality of foldably connected first reinforcing panels; and
a plurality of first reinforcing flaps, each of the first reinforcing end flaps is respectively foldably connected to a respective one of the plurality of first reinforcing panels, each of the first reinforcing end flaps overlying and generally conforming in shape to one of a corresponding first primary end flap;
wherein the plurality of first primary end flaps comprises at least one first free edge portion that extends in a generally longitudinal direction, and the plurality of first reinforcing end flaps comprises at least one second free edge portion that is generally aligned with the first free edge portion;
wherein at least one first reinforcing end flap of the plurality of first reinforcing end flaps overlaps the first proximal side end flap and comprises at least one third free edge portion that generally overlaps the longitudinal fold line.

25. The carton blank of claim 24, further comprising a second reinforcing blank adhered to the second marginal area of the primary blank.

26. The carton blank of claim 25, wherein the second reinforcing blank comprises a plurality of foldably connected second reinforcing panels and a plurality of second reinforcing flaps.

27. The carton blank of claim 25, further comprising a third reinforcing blank adhered to the primary blank and located between the first and second reinforcing blanks.

28. The carton blank of claim 24, wherein each of the first reinforcing panels is adhered to at least one of the first side panel, the bottom panel, the second side panel, and the top panel.

29. The carton blank of claim 28, wherein each of the first reinforcing flaps is adhered to at least one of the first primary end flaps.

30. The carton blank of claim 24, further comprising a second reinforcing blank adhered to a central area of the primary blank and spaced from the first reinforcing blank.

31. The carton blank of claim 24, wherein the first reinforcing blank is adhered to at least the first and second side panels.

32. The carton blank of claim 31, wherein the first reinforcing blank is adhered to at least the top panel, the bottom panel, and one or more of the first primary end flaps.

33. The carton blank of claim 24 wherein the plurality of first reinforcing end flaps are formed separately from the corresponding end flaps of the primary blank prior to attachment of the first reinforcing blank to the primary blank.

34. The carton blank of claim 24, wherein the first distal side end flap is for being disposed generally perpendicular to the first proximal side end flap when the carton blank is formed into a carton.

35. The carton blank of claim 24, wherein the first reinforcing blank is spaced apart from the plurality of second primary end flaps.

36. A carton formed from a primary blank and at least a first reinforcing blank, comprising:
a first side panel;
a bottom panel;
a second side panel;
a top panel;
at least one first end flap at least partially closing a first end of the carton; and
at least one second end flap at least partially closing a second end of the carton, wherein
the first reinforcing blank is adhered to the primary blank at the first end of the carton, at which end the carton is multi-ply, wherein the first reinforcing blank comprises a plurality of first reinforcing panels and at least one first reinforcing end flap foldably connected to one of the plurality of first reinforcing panels, the primary blank comprises a plurality of foldably connected primary panels and a plurality of first primary end flaps, each first primary end flap being foldably connected to at least one of the primary panels;
the at least one first reinforcing end flap overlies and generally conforms in shape to one of the first primary end flaps;
wherein the plurality of first primary end flaps comprises at least one first free edge portion that extends in a generally longitudinal direction, and the at least one first reinforcing end flap comprises at least one second free edge portion that is generally aligned with the first free edge portion;
wherein the first reinforcing blank and the primary blank comprise substantially identical materials;
wherein the plurality of first primary end flaps comprises at least one distal end flap foldably connected to at least one proximal end flap along a longitudinal fold line, and the first reinforcing blank comprises at least one second reinforcing end flap that overlaps the at least one proximal end flap and comprises at least one third free edge portion that generally overlaps the longitudinal fold line.

37. The carton of claim 36, wherein at least a part of the first reinforcing blank extends across the first end of the carton.

38. The carton of claim 37, wherein the first reinforcing blank is adhered to at least the first and second side panels.

39. The carton of claim 38, wherein the first reinforcing blank is adhered to at least the top panel and the bottom panel.

40. The carton of claim 36, further comprising a second reinforcing blank adhered to the primary blank at the second end of the carton, at which end the carton is multi-ply.

41. The carton of claim 40, further comprising a third reinforcing blank adhered to the primary blank and located between the first and second reinforcing blanks.

42. The carton of claim 36, wherein the bottom panel includes a transverse fold line extending across a width of the bottom panel.

43. The carton of claim 42, wherein the top panel comprises a first top panel adhered to a second top panel.

44. The carton of claim 36 wherein the at least one first reinforcing end flap are formed separately from the corresponding end flaps of the primary blank prior to attachment of the first reinforcing blank to the primary blank.

45. The carton of claim 36, wherein the at least one distal end flap is disposed generally perpendicular to the at least one proximal end flap.

46. The carton of claim 36, wherein the first reinforcing blank is spaced apart from the at least one second end flap.

47. A method of forming carton, comprising:
providing a primary blank, the primary blank comprising:
a plurality of foldably connected primary panels;
a plurality of first primary end flaps, the plurality of first primary end flaps comprising at least one first free edge portion that extends in a generally longitudinal direction and at least one distal end flap foldably connected to at least one proximal end flap along a longitudinal fold line; and a plurality of second primary end flaps; and providing a first reinforcing blank, wherein the first reinforcing blank and the primary blank comprise substantially identical materials, the first reinforcing blank comprising a plurality of foldably connected first reinforcing panels and a plurality of first reinforcing end flaps;

adhering the first reinforcing blank to the primary blank to form a multi-ply blank, aligning a second free edge portion of the plurality of first reinforcing end flaps with the first free edge portion of the plurality of first primary end flaps, positioning at least one first reinforcing end flap of the plurality of first reinforcing end flaps to overlap the at least one proximal end flap, and positioning at least one third free edge portion of the at least one first reinforcing end flap to generally overlap the longitudinal fold line; and folding the multi-ply blank along one or more fold lines, wherein folding the multi-ply blank along one or more fold lines comprises folding a bottom panel of the primary blank along a transverse fold line.

48. The method of claim 47, wherein the plurality of first primary end flaps is foldably connected along a first longitudinal fold line, and the plurality of second primary end flaps is foldably connected along a second longitudinal fold line.

49. The method of claim 48, wherein folding the multi-ply blank along one or more fold lines comprises:

folding the plurality of first primary end flaps about the first longitudinal fold line; and folding the plurality of second primary end flaps about the second longitudinal fold line.

50. The method of claim 47, wherein adhering the first reinforcing blank to the primary blank comprises adhering each of the first reinforcing panels to at least one of the primary panels.

51. The method of claim 50, wherein each of the first reinforcing flaps is adhered to at least one of the first primary end flaps.

52. The method of claim 47, further comprising adhering a second reinforcing blank to the primary blank.

53. The method of claim 52, wherein the second reinforcing blank comprises a plurality of foldably connected second reinforcing panels, wherein each of the second reinforcing panels is adhered to at least one of the primary panels.

54. The method of claim 52, further comprising adhering a third reinforcing blank to the primary blank between the first and second reinforcing blanks.

55. The method of claim 47, wherein folding the multi-ply blank along one or more fold lines comprises folding at least one extension over a top panel of the primary blank.

56. A primary carton blank in combination with at least one reinforcing blank, the at least one reinforcing blank for being attached to the primary carton blank, the primary blank comprising:

a plurality of foldably connected primary panels;

a plurality of first primary end flaps, each first primary end flap being foldably connected to at least one of the primary panels, the plurality of first primary end flaps comprising at least one first free edge portion that extends in a generally longitudinal direction; and a plurality of second primary end flaps, each second primary end flap being foldably connected to at least one of the primary panels; and wherein the at least one reinforcing blank comprises:

a plurality of foldably connected reinforcing panels; and a plurality of reinforcing end flaps, each of the reinforcing end flaps is respectively foldably connected to a respective one of the plurality of reinforcing panels, each of the reinforcing end flaps generally conforming in shape to a corresponding first primary end flap of the primary blank, wherein the plurality of reinforcing end flaps comprises at least one second free edge portion that is for being generally aligned with the first free edge portion when the at least one reinforcing blank is attached to the primary carton blank;

wherein the at least one reinforcing blank and the primary blank comprise substantially identical materials;

wherein the plurality of first primary end flaps comprises at least one distal end flap foldably connected to at least one proximal end flap along a longitudinal fold line, and at least one reinforcing end flap of the plurality of reinforcing end flaps overlaps the at least one proximal end flap and comprises at least one third free edge portion that is for generally overlapping the longitudinal fold line when the at least one reinforcing blank is attached to the primary carton blank.

57. The combination of claim 56, wherein the at least one distal end flap is for being disposed generally perpendicular to the at least one proximal end flap when the carton blank is formed into a carton.

58. The combination of claim 56, wherein the first reinforcing blank is spaced apart from the plurality of second primary end flaps.

* * * * *